United States Patent
Lavoie et al.

(10) Patent No.: US 7,325,876 B2
(45) Date of Patent: Feb. 5, 2008

(54) SEAT ASSEMBLY WITH SEAT BACK LOCKOUT

(75) Inventors: Scott Lavoie, Red Oak, IA (US); Omar D. Tame, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/543,399

(22) PCT Filed: Mar. 10, 2004

(86) PCT No.: PCT/US2004/007376

§ 371 (c)(1),
(2), (4) Date: Jul. 26, 2005

(87) PCT Pub. No.: WO2004/080751

PCT Pub. Date: Sep. 23, 2004

(65) Prior Publication Data

US 2006/0138844 A1    Jun. 29, 2006

(51) Int. Cl.
*B60N 2/00*    (2006.01)

(52) U.S. Cl. ............... 297/378.12; 297/335; 297/336; 296/65.09; 296/65.16

(58) Field of Classification Search ............... 297/336, 297/378.12, 335; 296/65.03, 65.09, 65.16
See application file for complete search history.

(56) References Cited

U.S. PATENT DOCUMENTS

| | | | |
|---|---|---|---|
| 4,484,776 A | 11/1984 | Gokimoto et al. | |
| 4,840,427 A * | 6/1989 | Hong | ............ 297/344.14 |
| 5,368,355 A | 11/1994 | Hayden et al. | |
| 5,393,116 A | 2/1995 | Bolsworth et al. | |
| 5,577,805 A | 11/1996 | Glinter et al. | |
| 5,611,600 A | 3/1997 | Busch et al. | |
| 5,749,625 A | 5/1998 | Robinson | |
| 5,904,403 A | 5/1999 | Unckrich | |
| 5,938,286 A | 8/1999 | Jones et al. | |
| 5,941,591 A * | 8/1999 | Tsuge et al. | ............ 296/65.09 |
| 6,000,742 A * | 12/1999 | Schaefer et al. | ......... 296/65.09 |
| 6,024,411 A | 2/2000 | Pesta | |
| 6,135,555 A | 10/2000 | Liu et al. | |
| 6,155,626 A | 12/2000 | Chabanne et al. | |

(Continued)

FOREIGN PATENT DOCUMENTS

FR    2 796 897    2/2001

(Continued)

*Primary Examiner*—Sarah B. McPartlin
(74) *Attorney, Agent, or Firm*—Clark Hill PLC

(57) ABSTRACT

A seat assembly includes a seat cushion having a riser releasably secured to a floor. A seat back operatively coupled to the seat cushion pivots between seating and folded positions. A recliner is coupled between the seat back and seat cushion. Rotation of an input shaft actuates the recliner between locked and unlocked states. A lockout mechanism controls actuation of the recliner and includes a lock plate fixedly secured to the input shaft and a lock arm operatively coupled to the riser. The lock arm moves between a retracted position allowing rotation of the input shaft and actuation of the recliner when the riser is latched to the floor and an extended position wherein the lock plate abuts the lock arm preventing rotation of the input shaft and actuation of the recliner when the seat back is in the folded position and the riser is unlatched from the floor.

30 Claims, 9 Drawing Sheets

U.S. PATENT DOCUMENTS

| | | |
|---|---|---|
| 6,158,800 A | 12/2000 | Tsuge et al. |
| 6,161,899 A | 12/2000 | Yu |
| 6,227,619 B1 | 5/2001 | Pesta et al. |
| 6,250,704 B1 | 6/2001 | Garrido |
| 6,290,297 B1 | 9/2001 | Yu |
| 6,345,867 B1 | 2/2002 | Hellrung et al. |
| 6,520,581 B1 | 2/2003 | Tame |
| 6,523,899 B1 | 2/2003 | Tame |
| 6,698,837 B2 * | 3/2004 | Pejathaya et al. ...... 297/378.12 |
| 6,793,285 B1 * | 9/2004 | Tame ...................... 297/336 |
| 2003/0090138 A1 | 5/2003 | Rabbach et al. |
| 2003/0102705 A1 | 6/2003 | Pejathaya et al. |

FOREIGN PATENT DOCUMENTS

| | | |
|---|---|---|
| GB | 2 251 183 | 7/1992 |
| WO | WO 96/20848 | 7/1996 |
| WO | WO 00/55003 | 9/2000 |

* cited by examiner

SEAT ASSEMBLY WITH SEAT BACK LOCKOUT

BACKGROUND OF THE INVENTION

1. Field of the Invention

The invention relates to a seat assembly for an automotive vehicle having a seat back pivotally coupled to a seat cushion for selective movement between a plurality of seating positions and a folded position. More particularly, the invention relates to a lockout mechanism for selectively locking the seat back in the folded position.

2. Description of the Related Art

Automotive vehicles include seat assemblies for supporting occupants above a floor in the vehicle. Seat assemblies include a seat cushion and a seat back. Typically, the seat back is coupled to the seat cushion by a recliner mechanism that allows selective pivotal adjustment of the seat back relative to the seat cushion between a plurality of seating positions and a forwardly folded position overlying the seat cushion.

It is widely known to provide riser assemblies between the seat cushion and the floor of the vehicle to allow selective tumbling of the seat cushion between a generally horizontal seating position and an upright tumbled position. The riser assembly is also lockingly engagable with a striker that is fixedly secured to the floor of the vehicle for locking the seat cushion in the seating position. The riser assembly must be unlocked from engagement with the striker prior to moving the seat cushion to the tumbled position from the seating position. Typically, the seat back is placed in the forwardly folded position prior to moving the seat cushion to the upright tumbled position.

It is desirable to lock the seat back in the forwardly folded position while the riser remains unlocked from the striker on the floor of the vehicle to ensure that the seat back is only returned to the seating position for occupant use after the riser assembly is re-locked to the striker and floor of the vehicle.

SUMMARY OF THE INVENTION

According to one aspect of the invention, a seat assembly for supporting an occupant above a floor of an automotive vehicle is provided. The seat assembly includes a seat cushion and seat cushion frame. A riser mechanism secured to the seat cushion and is operatively coupled to the floor of the vehicle. The seat assembly also includes seat back and seat back frame. A recliner mechanism is coupled between the seat cushion and the seat back for pivotally adjusting the seat back relative to the seat cushion. A lockout mechanism including a swing arm is associated with the recliner mechanism. The swing arm includes a flange formed at a distal end. A lock arm is associated with the seat cushion for selective movement in and out of a swing path of the flange of the swing arm.

According to another aspect of the invention, a seat assembly for supporting an occupant above a floor of an automotive vehicle is provided. The seat assembly includes a seat cushion having a seat cushion frame. A riser mechanism secured to the seat cushion is operatively coupled to a floor of the vehicle. The seat assembly also includes a seat back having a seat back frame. A recliner mechanism is coupled between the seat cushion and said seat back for pivotally adjusting the seat back relative to the seat cushion. The recliner mechanism has a sector having a plurality of teeth extending radially outwardly from the seat back frame. A pawl including a notch is selectively moveable in and out of locking engagement with the rack of teeth of the sector. The seat assembly also includes a lockout mechanism having a lock arm having a pawl end and a cam end. The pawl end is moveable in an out of the notch for maintaining and releasing the pawl from locking engagement with the rack of teeth of the sector.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
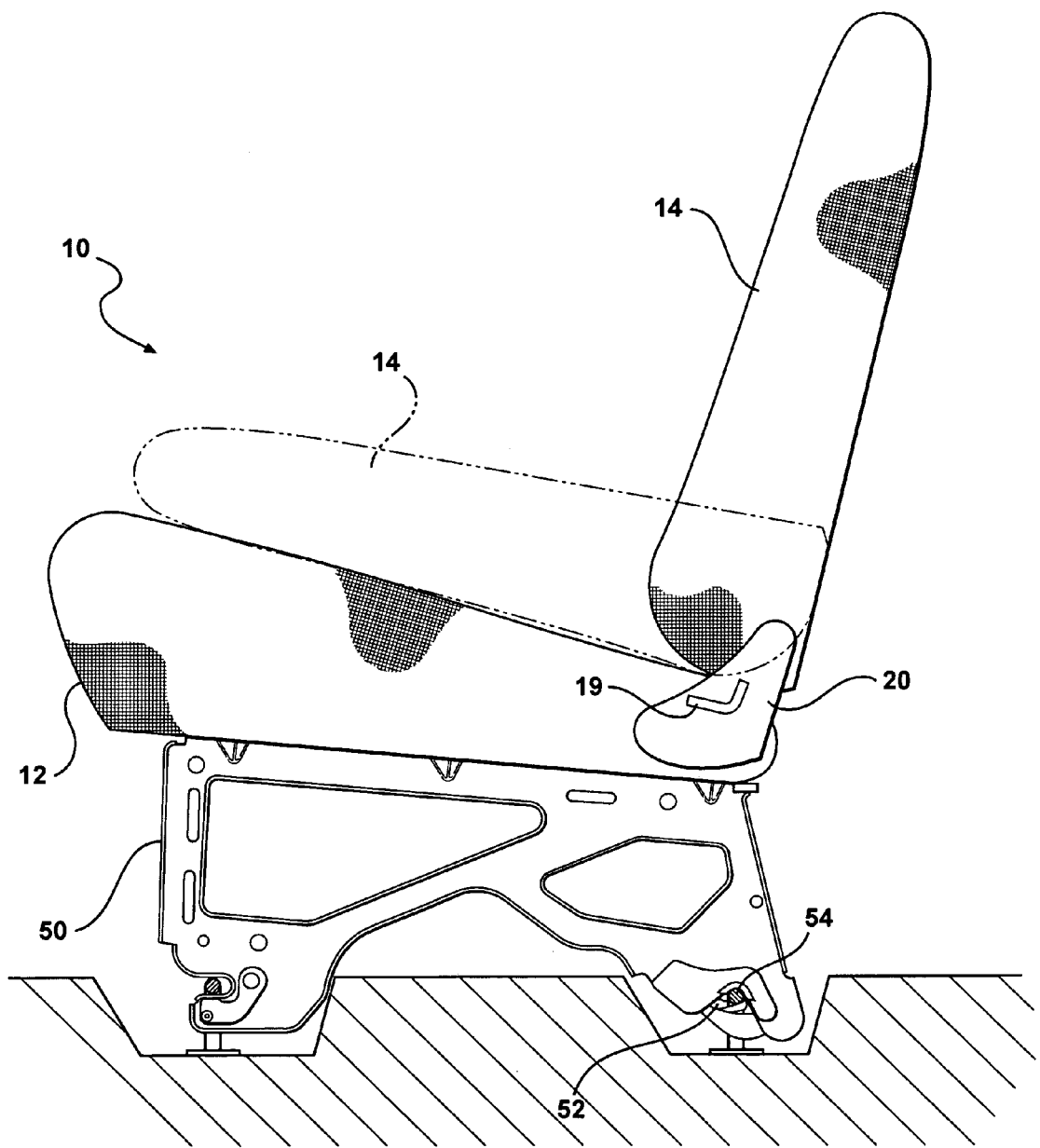
FIG. 1 is a side view of a seat assembly with the seat back shown in a seating position and forwardly folded position overlaying the seat cushion.

Referring to FIGS. 1-5, a seat assembly according to one embodiment of the invention for an automotive vehicle is generally indicated at 10. The seat assembly 10 includes a seat cushion 12 and a seat back 14. The seat cushion 12 includes a cushion frame 16 and the seat back 14 includes a back frame 18. A recliner mechanism 20 is operatively coupled between and to both the cushion frame 16 and the back frame 18. The recliner mechanism 20 allows pivotal adjustment of the seat back 14 relative to the seat cushion 12 between a plurality of generally upright seating positions, and a non-seating, forwardly folded position, overlying the seat cushion 12, as shown in FIG. 1. Preferably, the seat back 14 is pivotally biased toward the forwardly folded position by a biasing member (not shown), as known to those skilled in the art.

The recliner mechanism 20 is movable between locked and unlocked states. In the locked state, the recliner mechanism 20 maintains the seat back 14 in any one of the plurality of seating positions or the forwardly folded position. In the unlocked state, the seat back 14 is freely movable among the plurality of seating positions and the forwardly folded position. The recliner mechanism 20 can be any suitable type known to those skilled in the art, such as a disc-type recliner mechanism. An example of a recliner mechanism is fully disclosed in applicant's U.S. Pat. No. 6,312,053, which issued on Nov. 6, 2001 and is incorporated herein by reference in its entirety.

Described in detail below, a lockout mechanism 21 is operatively coupled to the recliner mechanism 20 for preventing actuation of the recliner mechanism 20 between the locked and unlocked states while the seat back 14 is in the forwardly folded position, in response to a pre-defined mechanical condition, such as an unlocked riser mechanism 40.

An input shaft 22 is rotatably coupled to the recliner mechanism 20 for actuating the recliner mechanism 20 between the locked and unlocked states in response to counterclockwise and clockwise rotation of the input shaft 22, respectively, as viewed from the perspective of the Figures. The input shaft 22 extends axially outwardly from the recliner mechanism 20 and defines a shaft pivot axis 24.

The lockout mechanism 21 includes a lock plate 23 fixedly secured to the end of the input shaft 22 for rotation therewith. The lock plate 23 overlays the cushion frame 16 such that the cushion frame 16 is sandwiched between the lock plate 23 and recliner mechanism 20. A pair of spaced apart control rods 25, 27 project outwardly from the lock plate 23 on opposing sides of the input shaft 22 for attachment of a recliner handle 17 to rotate the lock plate 23 in the clockwise and counterclockwise directions, and in turn, actuate the recliner mechanism 20 between the locked and unlocked states.

The lockout mechanism 21 also includes a swing arm 26 extending radially outwardly from the lock plate 23 for rotation with the input shaft 22 about the shaft pivot axis 24 during actuation of the recliner mechanism 20 between the locked and unlocked states. The swing arm 26 includes a distal end 28. A flange 30 is formed along the distal end 28 of the swing arm 26, which defines an abutment surface 32. The flange 30 moves along and defines a swing path about the arc of the recliner 20 as the lock plate 23 rotates with the input shaft 22 to lock and unlock the recliner mechanism 20. A generally arcuate shaped slotted opening 29 is also formed in the lock plate 23 and spaced below the input shaft for cooperation with the riser mechanism, as will be described in further detail below. Additionally, a biasing spring 19 connects between the lock plate 23 and the cushion frame 16 for biasing the lock plate 23 is the counterclockwise direction to maintain the recliner mechanism 20 in the locked state.

Figure 2:
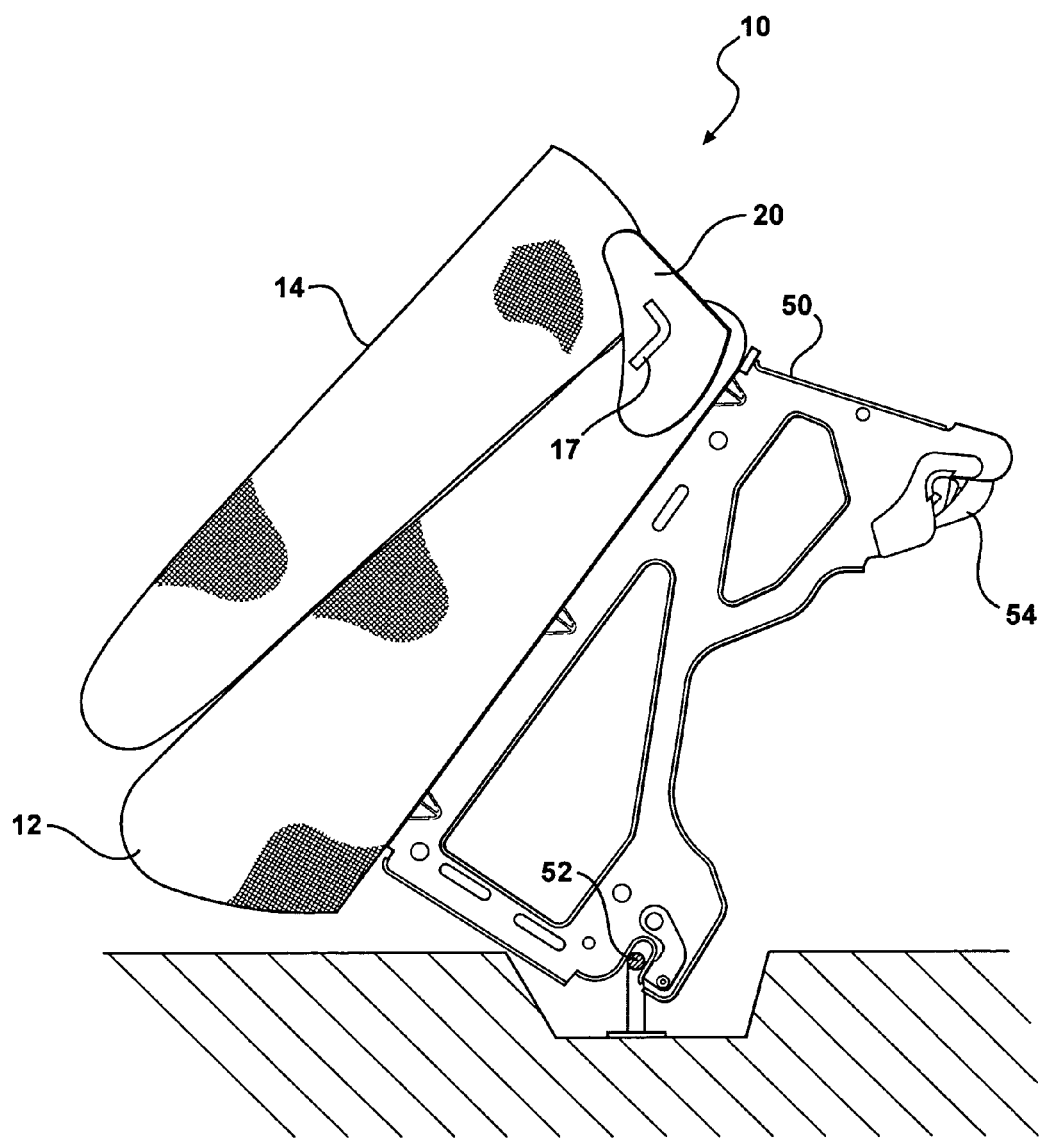
FIG. 2 is a side view of the seat assembly with the seat back shown in the forwardly folded position and the seat cushion shown in the upright tumbled position.
Figure 3:
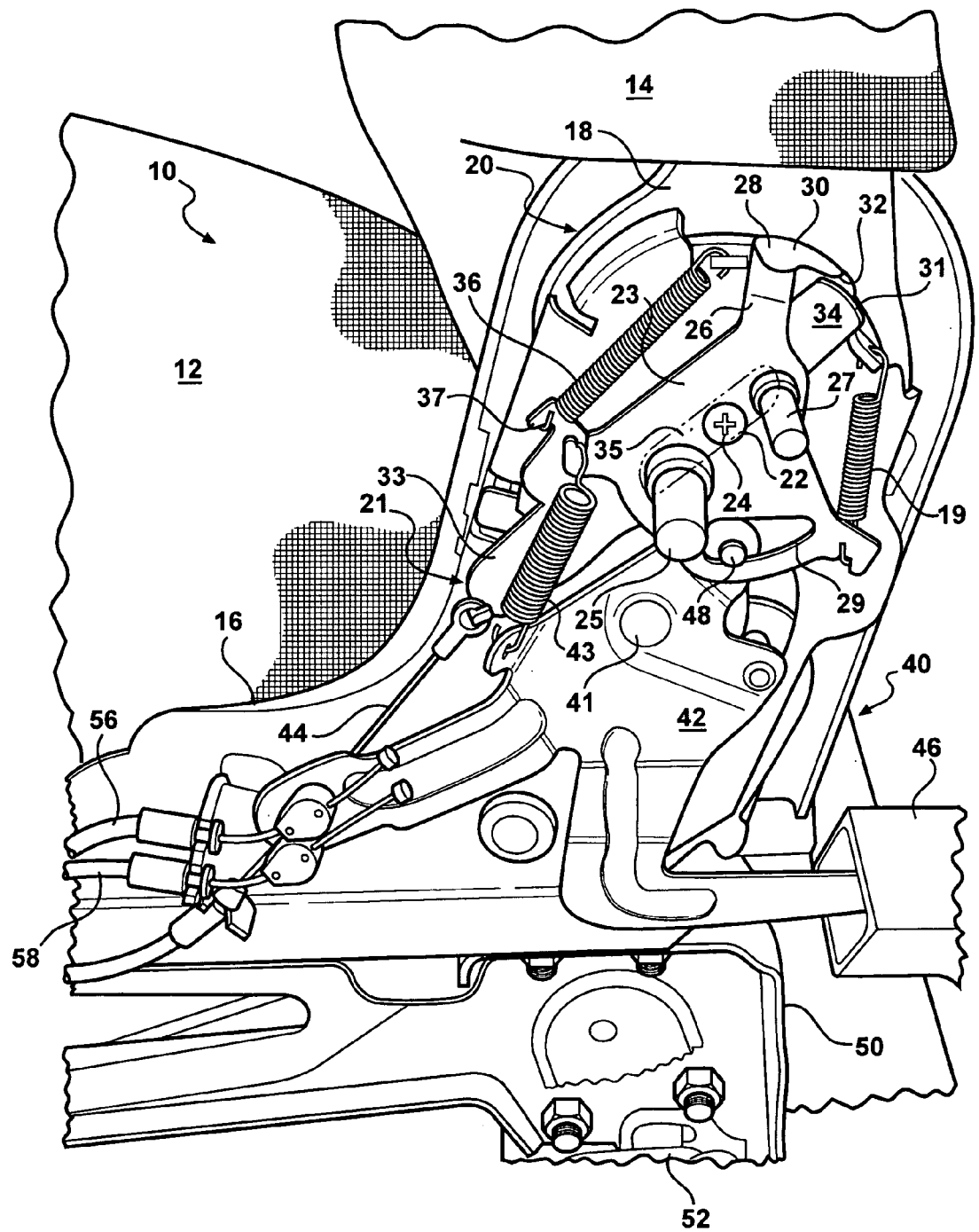
FIG. 3 is a perspective view of the seat assembly with the seat back in the seating position and incorporating a lockout mechanism according to one embodiment of the invention.
Figure 4:
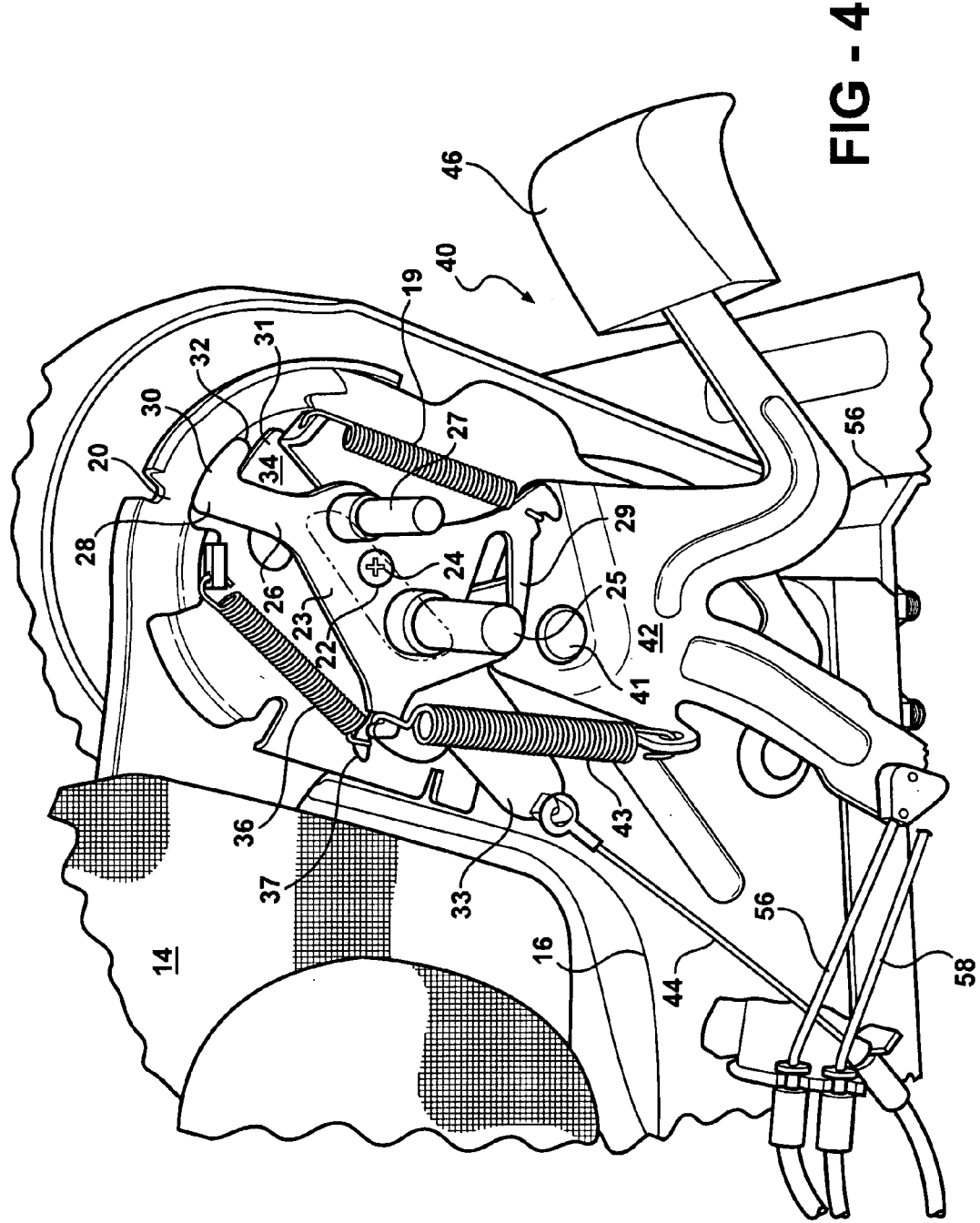
FIG. 4 is a perspective view of the lockout mechanism of FIG. 3 with the seat back adjusted toward a forwardly folded position.
Figure 5:
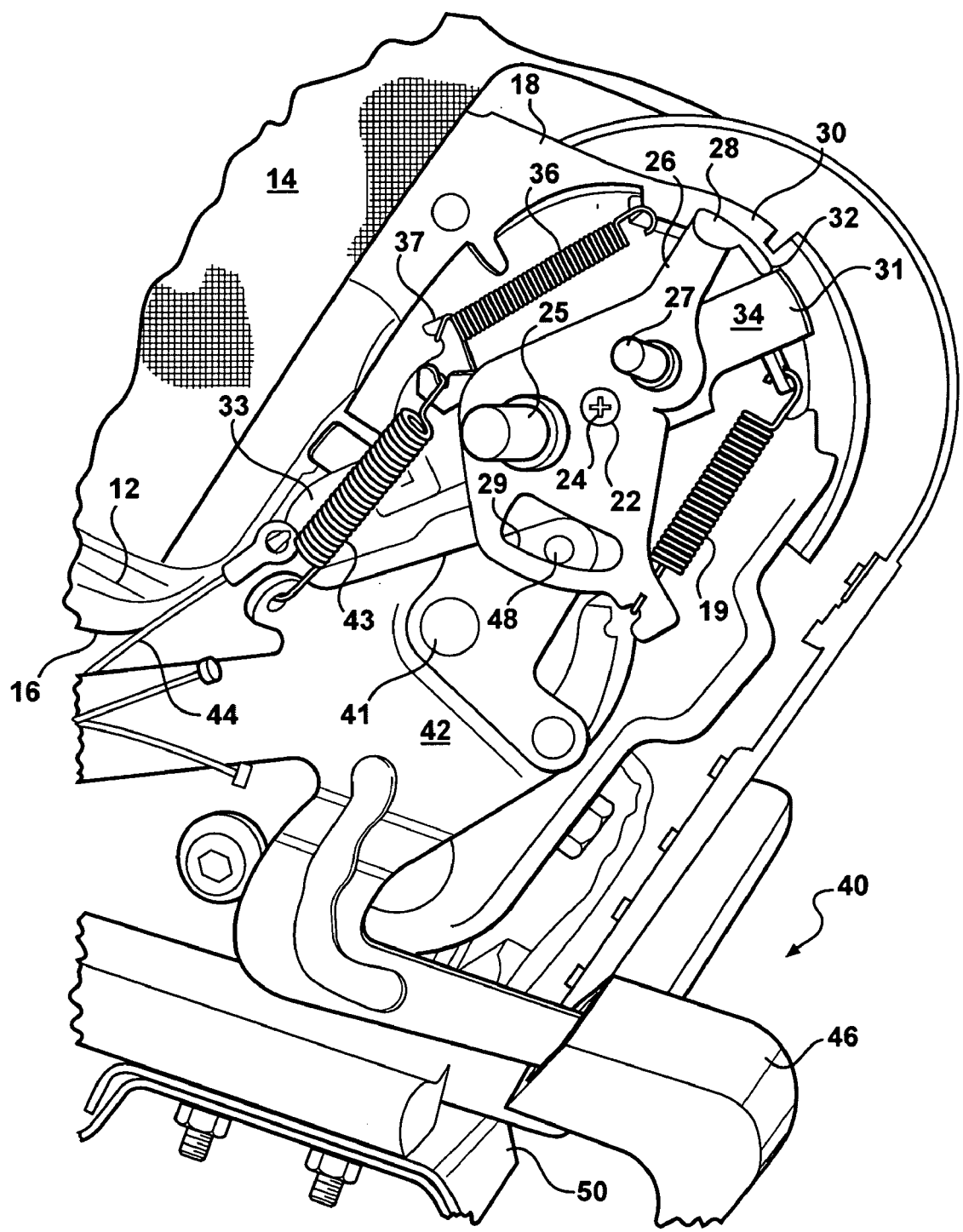
FIG. 5 is a perspective view of the lockout mechanism of FIG. 3 with the seat back in the forwardly folded position and the seat cushion in the tumbled position.

The lockout mechanism 21 also includes a lock arm 34 that is slidably coupled between the cushion frame 16 and the lock plate 23 for selective movement in and out of the swing path of the flange 30. The lock arm 34 includes an elongated slot 35 therein for receiving the input shaft 22 to slidably couple the lock arm 34 between the lock plate 23 and the cushion frame 16 for linear movement between an extended position projecting into the swing path of the flange 30 and a retracted position pulled out of or spaced from the swing path of the flange 30. The lock arm 34 includes first and second ends 31, 33, wherein the first end 31 projects into the swing path of the flange 30 in the extended position for engagement with the flange 30. Additionally, a hook portion 37 projects from the lock arm 34 adjacent the second end 33 thereof for attaching a biasing spring 36 between the hook portion 37 and the cushion frame 16 for continuously biasing the lock arm 34 toward the extended position and into the swing path of the flange 30. The swing path of the flange 30 is defined by the rotational movement of the input shaft 22 about the shaft pivot axis 24, and with it the rotational movement of the lock plate 23, for actuation of the recliner mechanism 20 between the locked and unlocked states. While in the swing path, the lock arm 34 is extended and presented for engagement with the abutment surface 32 of the flange 30 to prevent rotational movement of lock plate 23 and input shaft 22, and thus, prevent actuation of the recliner mechanism 20 between the locked and unlocked states. With the lock arm 34 retracted and out of the swing path, the lock plate 23 and input shaft 22 is freely movable to actuate the recliner mechanism 20 between the locked and unlocked states without interference between the abutment surface 32 and the lock arm 34. The lock arm 34, in the embodiment of FIGS. 3-5, is operatively coupled to a riser mechanism 40 that extends between the seat cushion 12 and a floor in the vehicle. The riser mechanism 40 can be any type known to those skilled in the art for releasably locking the seat assembly 10 to the floor of the vehicle. For example, a typical riser mechanism is disclosed in applicant's U.S. Pat. No. 6,523,899, which issued on Feb. 25, 2003, and is incorporated herein by reference in its entirety. Another example of a typical riser mechanism is disclosed hereinbelow and shown in FIGS. 6-9. The riser mechanism 40 allows selective tumbling or pivoting of the seat cushion 12, and thus seat assembly 10, between a generally horizontal seating position, as shown in FIG. 1, and an upright tumbled position, as shown in FIG. 2.

The riser mechanism 40 includes a release handle 42 pivotally coupled to the cushion frame 16 by pivot shaft 41. The release handle 42 includes a release arm 46 for rotating the release handle 42 about the pivot shaft 41 and a guide pin 48 received in the slotted opening 29 in the lock plate 23 for coupling the release handle 42 and lockout mechanism 21. A biasing spring 43 extends between the release handle 42 and the lock plate 23 rotatably biasing the release handle 42 in a clockwise direction, as viewed in the Figures.

The seat assembly 10 further includes a riser support 50 secured to the bottom of the seat cushion 12 for elevating the seat assembly 10 above the floor of the vehicle and pivotally supporting the seat cushion 12 between the seating position and the tumbled position. The riser mechanism 40 further includes a pair of latch mechanisms 52, one on each lateral side of the seat assembly 10, operatively coupled to the riser support 50 for releasably securing the riser support 50 to a striker 54 in the floor of the vehicle as is commonly known in the art and illustrated in U.S. Pat. No. 6,523,899.

A pair of Bowden-type cable assemblies 56, 58 extend between the release handle 42 and each of the latch mechanisms 52 for releasing the latch mechanisms 52 from engagement with the strikers 54 in the floor and allow the seat cushion 12, and seat assembly 10, to pivot about the front of the riser support 50 from the seating position to the tumbled position.

The release handle 42 operatively interconnects the recliner mechanism 20 and the riser mechanism 40 for sequentially unlocking the recliner mechanism 20 and then the riser mechanism 40 so that the seat back 14 can be folded to the forwardly folded position prior to pivoting of the seat cushion 12 to the tumbled position or removal of the seat assembly 10 from the floor of the vehicle.

Finally, a cable 44 extends between the second end 33 of lock arm 34 and the latch mechanism 52 of the riser mechanism 40 for maintaining the lock arm 34 out of the swing path of the flange 30 against the bias of the spring 36 while the riser mechanism 40 remains locked to the floor of the vehicle with the seat cushion in the seating position.

When the riser mechanism 40 is released from the floor of the vehicle for pivotal movement of the seat cushion 12 toward the tumbled position, the cable 44 is slackened. The slack in the cable 44 allows the spring 36 to move the lock arm 34 from the retracted position to the extended position and into the swing path of the flange 30 for preventing actuation of the recliner mechanism 20 between the locked and unlocked positions.

In operation, the lock arm 34 is maintained in the retracted position and out of the swing path of the flange 30 by the cable 44 while the riser mechanism 40 is locked to the floor of the vehicle, as best shown in FIG. 3. To adjust the reclined seating position of the seat back 14 or to pivot the seat back 14 from one of the plurality of seating position to the forwardly folded position overlaying the seat cushion 12, the recliner handle 17 may be pivoted to rotate the input shaft 22 and release the recliner mechanism 20 from the locked state to the unlocked state. The lock plate 23 is free to rotate with the input shaft 22 and pass through the swing path without the flange 30 of the swing arm 26 engaging the lock arm 34 in the retracted position as long as the riser mechanism remains in the latched condition with the strikers 54. Additionally, the slotted opening 29 in the lock plate 23 allows the lock plate 23 to freely rotate about the pivot axis 24 independent of and without affecting movement of the release handle 42 and riser mechanism 40 by providing a lost motion arrangement with the guide pin 48 traveling along the slotted opening 29. When the recliner handle 17 is released, the biasing spring 19 rotates the lock plate 23 and input shaft 22 in the counterclockwise direction to return the recliner mechanism 20 to the locked state.

To tumble the seat cushion 12, and thus seat assembly 10, from the seating position to the upright tumbled position, the release handle 42 is rotated counterclockwise, as shown in FIG. 4. The counterclockwise rotation of the release handle 42 first causes the guide pin 48 to travel along the slotted opening 29 until engaged with the lock plate 23. The release handle 42 then forces the lock plate 23 to rotate clockwise about the shaft pivot axis 24 also rotating the input shaft 22 to release the recliner mechanism 20 from the locked state to the unlocked state. With the recliner mechanism 20 unlocked, the seat back 14 is urged to pivot towards the forwardly folded position due to the force applied by the biasing member. Continued counterclockwise rotation of the release handle 42 also unlocks the latch mechanism 52 of the riser mechanism 40 from the strikers 54 in the floor of the vehicle, which creates slack in the cable 44. The slack in the cable 44 allows the spring 36 to move the lock arm 34 toward the extended position and the swing path of the flange 30. The flange 30, however, prevents the lock arm 34 from moving into the swing path of the flange 30 while the input shaft 22 is maintained in the unlocked state via the release handle 42.

Once the release handle 42 is released, the release handle 42 rotates clockwise due to the force applied by the biasing spring 43 to allow the input shaft 22 to rotate counterclockwise from the unlocked state, as shown in FIG. 4, to the locked state, as shown in FIG. 5. The flange 30 rotates counterclockwise with the lock plate 23 and input shaft 22 to allow the spring 36 to move the lock arm 34 fully into the extended position and into the swing path of the flange 30. The lock arm 34, while in the swing path of the flange 30, prevents clockwise rotation of the lock plate 23 and thus prevents movement of the input shaft 22 between the locked and unlocked states and retaining the recliner mechanism 20 in the locked state and the seat back 14 in the folded position. The lock arm 34 remains in the swing path of the flange 30 as long as the riser mechanism 40 remains unlatched from the floor of the vehicle. Thus, the seat back 14 is maintained in the forwardly folded position and cannot be selectively adjusted between the forwardly folded position and the plurality of seating positions as long as the riser mechanism 40 remains unlatched from the floor of the vehicle. In the upright tumbled position, the position of the seat 10 provides for additional stowage area behind the seat within the vehicle or the seat assembly 10 may be completely removed from the vehicle.

To return the seat 10 from the tumbled position to the seating position, the seat 10 is rotated toward the floor of the vehicle until the latch mechanisms 52 engage and relatch with the strikers 54 to lock the riser mechanism 40. Locking the riser mechanism 40 to the floor of the vehicle creates tension in the cable 44. The tensioned cable 44 pulls the lock arm 34 out of the swing path of the flange 30 against the bias of the spring 36. With the lock arm 34 out of the swing path of the flange 30, the lock plate 23 and input shaft 22 are freely movable about the shaft pivot axis 24 to actuate the recliner mechanism 20 between the locked and unlocked states. The lock arm 34 remains out of the swing path of the flange 30 as long as the riser mechanism 20 remains locked to the floor of the vehicle. Thus, the seat back 14 can be return from or selectively adjusted between the forwardly folded position and the plurality of seating positions as long as the riser mechanism 40 remains locked to the floor of the vehicle.

It should be appreciated that the lock arm 34 can be adapted to move in and out of the swing path of the flange 30 in response to any one of or a combination of mechanical conditions other than the unlocking and locking of the riser mechanism 40.

Figure 6:
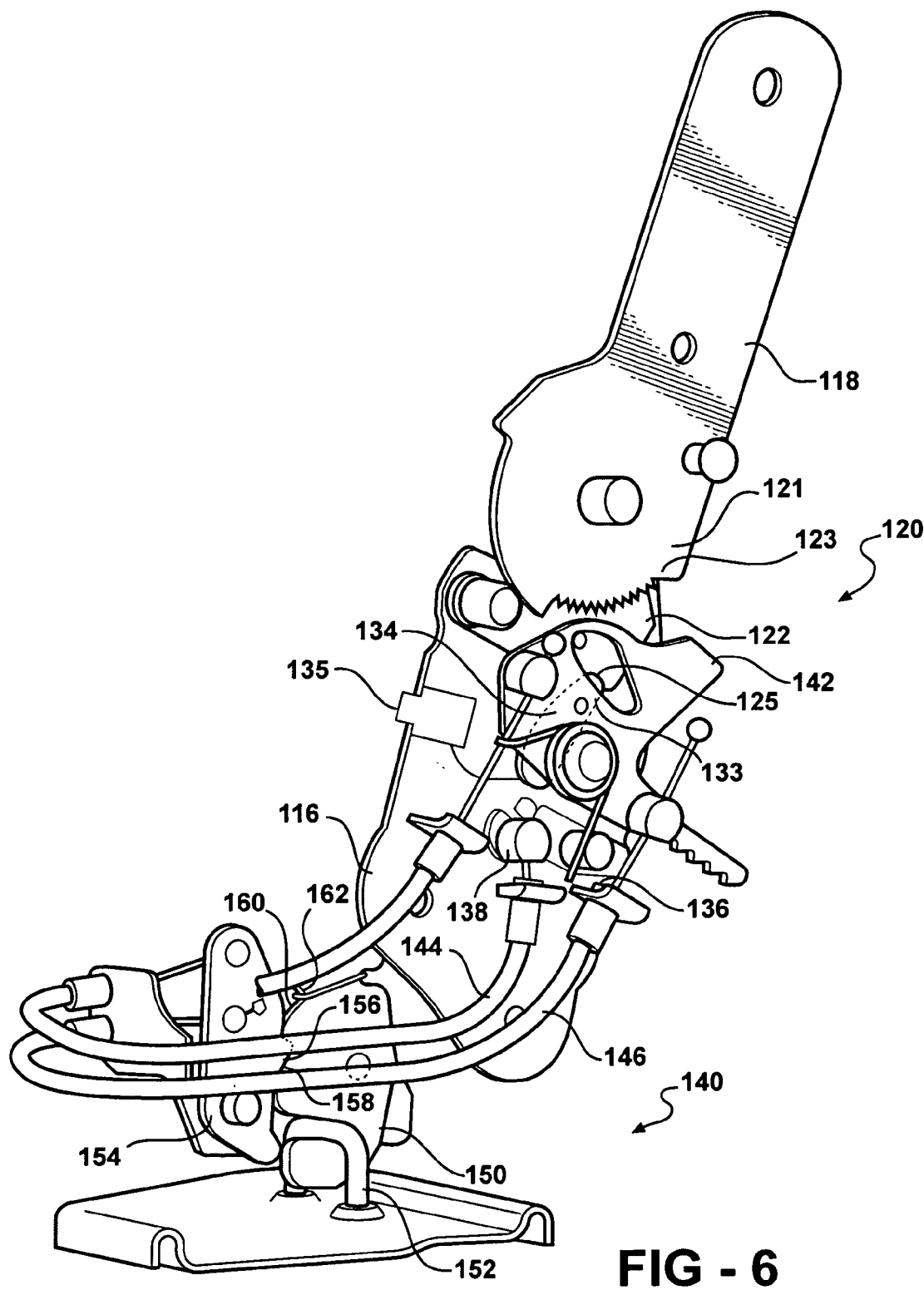
FIG. 6 is a perspective view of a second embodiment of the lockout mechanism with the seat back in the seating position and a riser mechanism engaged with a striker.
Figure 7:
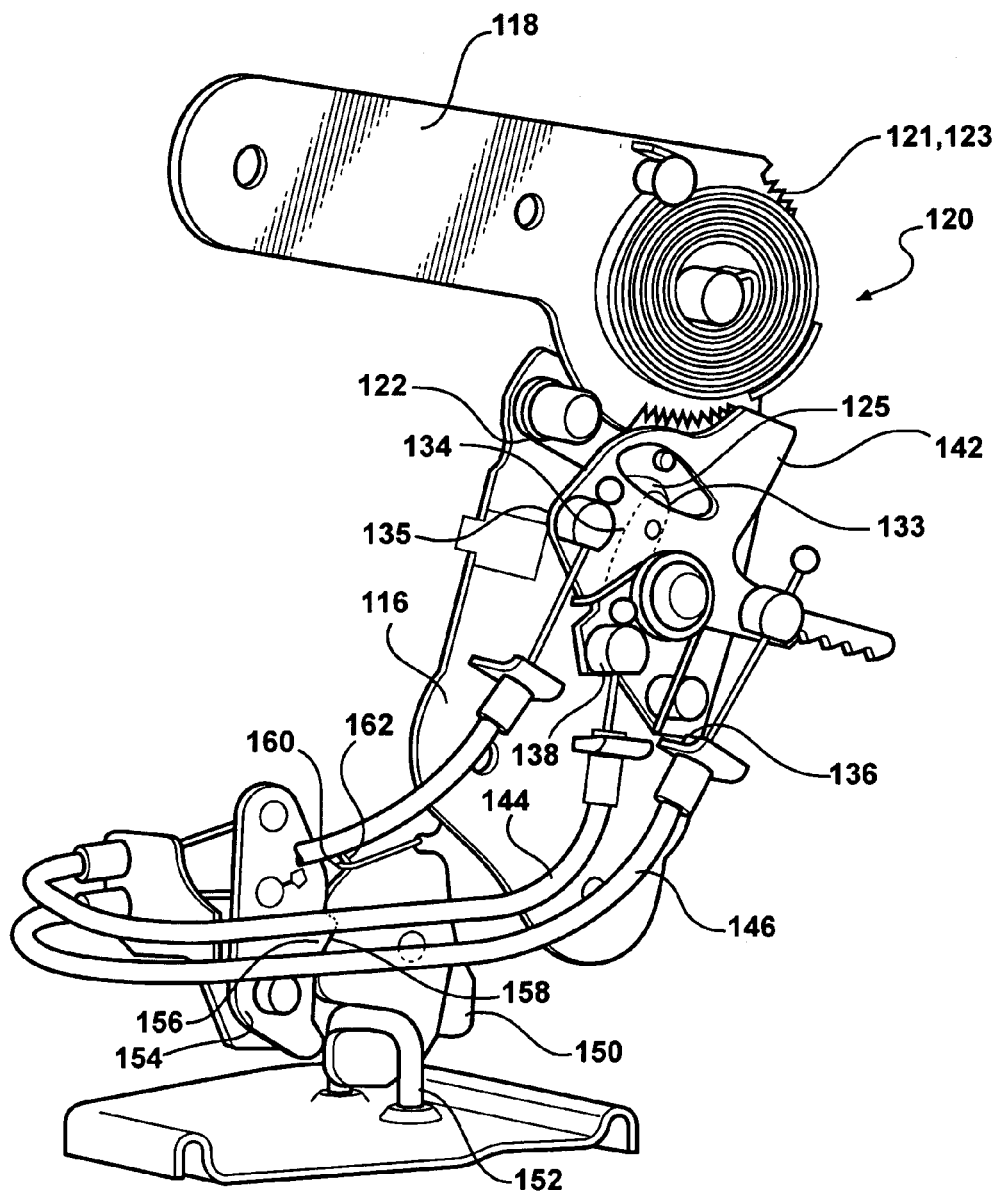
FIG. 7 is a perspective view of the second embodiment of the lockout mechanism with the seat back in the forwardly folded position and the riser mechanism engaged with the striker.
Figure 8:
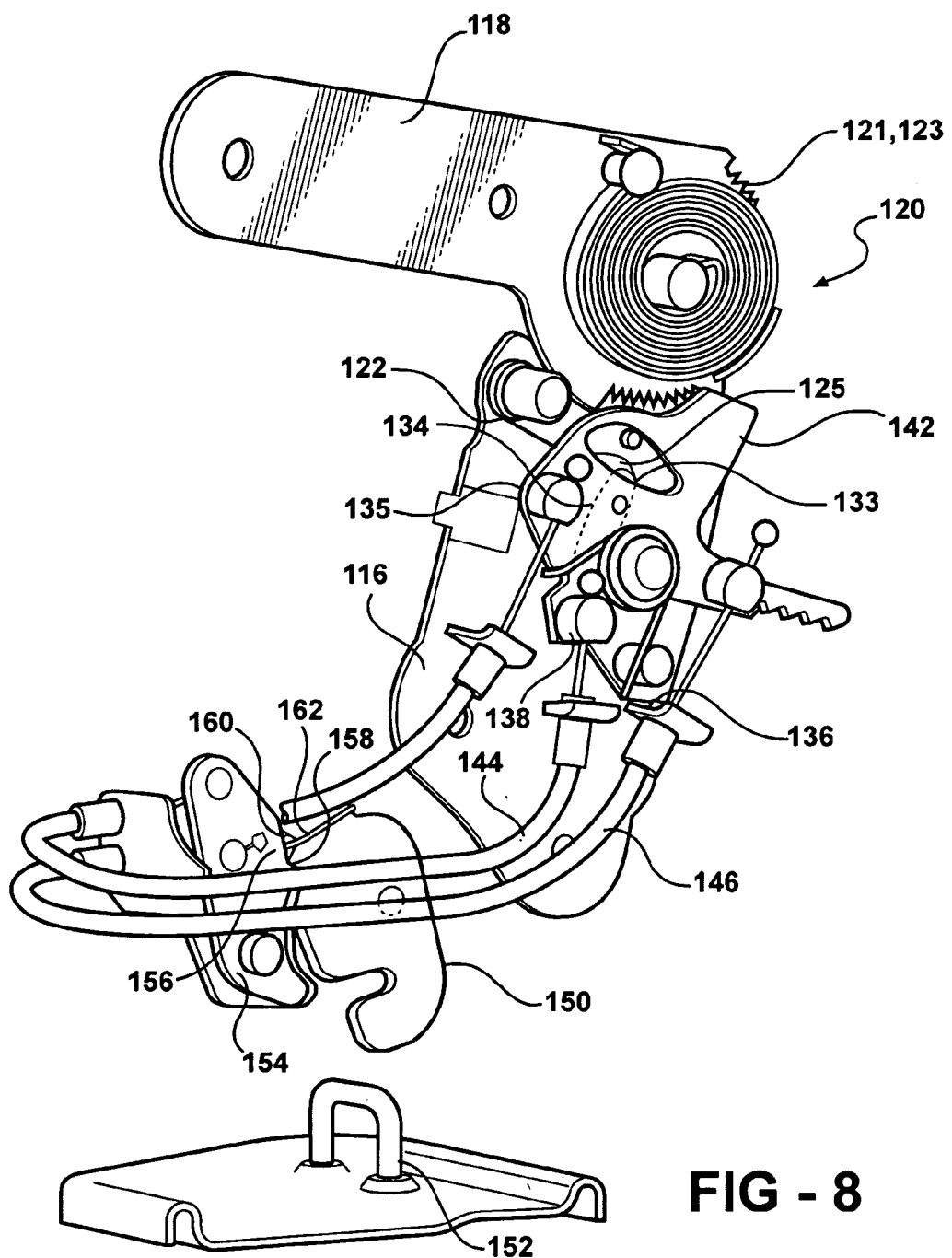
FIG. 8 is a perspective view of the second embodiment of the lockout mechanism with the seat back in the forwardly folded positions and the riser mechanism disengaged from the striker.

A second embodiment of the lockout mechanism is shown in FIGS. 6-8, wherein elements of the alternative embodiment similar to those in the first embodiment are indicated by reference characters that are offset by 100. The recliner mechanism 120 includes a sector 121 having a rack of teeth 123 extending radially outwardly from the back frame 118 and a pawl 122 selectively movable in and out of locking engagement with the rack of teeth 123 of the sector 121. While engaged with the rack of teeth 123, the pawl 122 prevents rotation of the seat back 14 relative to the seat cushion 12. With the pawl 122 disengaged from the rack of teeth 123, the seat back 14 is freely movable between the plurality of seating positions and the folded position. A notch 125 is formed in a side of the pawl 122 generally opposite the rack of teeth 123.

The release handle 142 is operatively coupled to both the pawl 122 and the riser mechanism 140 for sequentially unlocking the recliner mechanism 120 and then the riser mechanism 140 so that the seat back 14 can be folded to the forwardly folded position prior to tumbling of the seat assembly 10 or removal of the seat assembly 10 from the floor of the vehicle.

The lock arm 134 extends between a pawl end 133 and an opposite cam end 135. The lock arm 134 is pivotally coupled to the release handle 142 for movement of the pawl end 133 in and out of the notch 125. While seated in the notch 125, the pawl end 133 of the lock arm 134 maintains the pawl 122 in locking engagement with the rack of teeth 123, as shown in FIGS. 7 and 8. With pawl end 133 out of the notch 125, as shown in FIG. 6, the pawl 122 is selectively movable in and out of locking engagement with the rack of teeth 123 via actuation of the release handle 142.

A cam 138 is pivotally coupled to the cushion frame 116 for movement in and out of engagement with the cam end 135 of the lock arm 134. While engaged with the cam end 135, the cam 138 prevents rotation of the lock arm 134 and helps to maintain the pawl end 133 of the lock arm 134 within the notch 125. The spring 136 continuously biases the cam 138 toward engagement with the cam end 135 of the lock arm 134.

The cable 144 extends between the cam 138 and the riser mechanism 140 for moving the cam 138 in and out of engagement with the cam end 135 of the lock arm 134 in response to unlocking and locking of the riser mechanism 140 to the floor of the vehicle, respectively. More specifically, the riser mechanism 140 includes a latch 150 pivotally supported by the seat cushion 12 for movement in and out of locking engagement with a striker 152 fixedly secured to the floor of the vehicle. A latch pawl 154 having a lock tab 156 is pivotally supported by the seat cushion 12 for movement between a latched position, as shown in FIGS. 6 and 7, and an unlatched position, as shown in FIG. 8. Movement of the latch pawl 154 between the latched and unlatched positions causes the lock tab 156 to move in and out of engagement with a corresponding lock notch 158 formed in the latch 150. While engaged with the lock notch 158, as shown in FIGS. 6 and 7, the lock tab 156 maintains the latch 150 in locking engagement with the striker 152. A biasing member 160 extends between latch 150 and the latch pawl 154 for biasing the latch 150 and the latch pawl 154 in clockwise and counterclockwise directions, respectively. While the latch 150 is engaged with the striker, the biasing member 160 biases the lock tab 156 toward engagement with the lock notch 158.

A second cable 146 extends between the release handle 142 and the latch pawl 154 for rotating the latch pawl 154 counterclockwise toward the unlatched position and clockwise toward the latched position in response to corresponding unlocking and locking actuation of the release handle 142, respectively. Movement of the latch pawl 154 to the unlatched position is transferred to the latch 150 by the biasing member 160 so that the latch 150 rotates counterclockwise with the latch pawl 154 and disengages the striker 152 in the floor of the vehicle. The lock tab 156 falls out of engagement with the lock notch 158 and engages a cam surface 162 formed in the latch 150. The engagement between the lock tab 156 and the cam surface 162 keeps the latch 150 disengaged from the striker 152.

The cable 144 extends between the latch pawl 154 and the cam 138 for moving the cam 138 in and out of engagement with the cam end 135 of the lock arm 134 in response to rotation of the latch pawl 154 between the unlatched and latched positions, respectively. The rotation of the latch pawl 154, therefore, causes both disengagement of the latch 150 with the striker 152 and movement of the cam 138 toward engagement with the cam end 135 of the lock arm 134. Thus, the cam 138 remains engaged with the cam end 135, the pawl end 133 remains with the notch 125 in the pawl 122, and the pawl 122 remains engaged with the rack of teeth 123, as long as the latch 150 remains disengaged with the striker 152.

Figure 9:
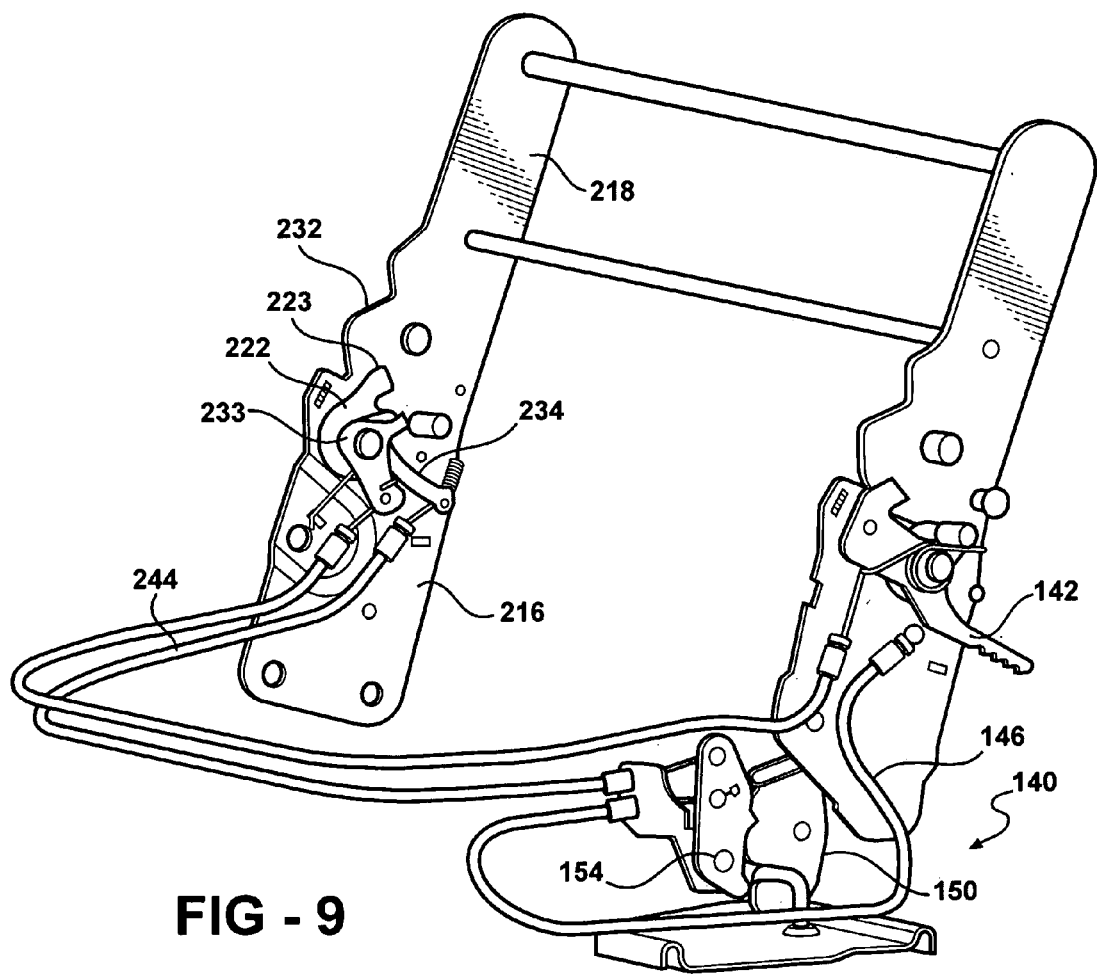
FIG. 9 is a perspective view of a third embodiment of the lockout mechanism and seat assembly.

A third embodiment of the lockout mechanism in shown in FIG. 9, wherein the pawl 222 is movable in and out of locking engagement with a slot 223 formed in the back frame 218 defining a single upright seating position. With the pawl 222 disengaged from the slot 223, the seat back 14 is movable between the upright seating position and the forwardly folded position. A second pawl 233 is pivotally coupled to the cushion frame 216 for movement in and out of abutting engagement with a stop surface 232 formed in the back frame 218. The second pawl 233 engages the stop surface 232 to maintain the seat back 14 in the forwardly folded position.

The cam 234 is pivotally coupled to the cushion frame 216 for movement in and out of engagement with the second pawl 233. While engaged with the second pawl 233, the cam 234 maintains the second pawl 233 in abutting engagement with the stop surface 232. With the cam 234 disengaged from the second pawl 233, the second pawl 233 is movable in and out of abutting engagement with the stop surface 232.

The cable 244 extends between the cam 234 and the riser mechanism 140 for moving the cam 234 in and out of engagement with the second pawl 233 in response to unlocking and locking of the riser mechanism 140 to the floor of the vehicle, respectively. Thus, while the riser mechanism 140 remains unlocked from the floor of the vehicle, the cam 234 is engaged with the second pawl 233 and the second pawl 233, in turn, remains engaged with the stop surface 232 to maintain the seat back 14 in the forwardly stowed position.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly for a motor vehicle comprising:
   a seat cushion;
   a riser mechanism secured to the seat cushion and pivotally coupled at one end to a floor of the vehicle and releasably secured to the floor at an opposite end;
   a seat back operatively coupled to the seat cushion for pivotal movement between an upright seating position and a forwardly folded position overlying the seat cushion;
   a recliner mechanism coupled between the seat cushion and seat back for pivotally adjusting the seat back relative to the seat cushion;
   an input shaft coupled to the recliner mechanism for actuating the recliner mechanism between a locked state and an unlocked state allowing pivotal movement of the seat back between the upright seating position and the forwardly folded position in response to rotation of the input shaft; and
   a lockout mechanism for controlling actuation of the recliner mechanism between the locked and unlocked states, the lockout mechanism including a lock plate fixedly secured to the input shaft for rotation therewith and a lock arm operatively coupled to the riser mechanism for movement between a retracted position allowing rotation of the input shaft and actuation of the recliner mechanism when the riser mechanism is latched to the floor, and an extended position wherein the lock plate abuts the lock arm thereby preventing rotation of the input shaft and actuation of the recliner mechanism when the seat back is in the forwardly folded position and the riser mechanism is unlatched from the floor.

2. The seat assembly of claim 1 wherein the lock plate includes a swing arm extending radially about the input shaft, the swing arm including a flange formed at a distal end thereof.

3. The seat assembly of claim 2 wherein the flange of the swing arm abuts the lock arm in the extended position thereby preventing rotation of the input shaft and actuation of the recliner mechanism.

4. The seat assembly of claim 3 including a spring biasing the lock arm into the extended position.

5. The seat assembly of claim 4 including a cable extending between the lock arm and the riser mechanism for maintaining the lock arm in the retracted position against the bias of the spring when the riser mechanism is latched to the floor of the vehicle.

6. The seat assembly of claim 5 including a release handle operatively coupled to the input shaft and riser mechanism such that actuating the release handle rotates the input shaft to actuate the recliner mechanism from the locked state to the unlocked state and unlatches the riser mechanism from the floor.

7. The seat assembly of claim 6 including a biasing spring extending between the release handle and the lock plate for biasing the release handle in a direction opposite the lock plate.

8. The seat assembly of claim 7 including at least one cable extending between the release handle and the riser mechanism for unlatching the riser mechanism from the floor in response to actuating the release handle.

9. The seat assembly of claim 8 including a spring extending between the lock plate and the seat cushion biasing the lock plate in a direction to maintain the recliner mechanism in the locked state.

10. The seat assembly of claim 9 wherein the lock plate includes a generally arcuate slot.

11. The seat assembly of claim 10 wherein the release handle includes a guide pin received in the slot in the lock plate operatively coupling the release handle and the lockout mechanism.

12. The seat assembly of claim 11 including a recliner handle fixedly secured to the lock plate for rotating the lock plate thereby rotating the input shaft to actuate the recliner mechanism between the locked and unlocked states.

13. The seat assembly of claim 12 wherein the slot in the lock plate provides a lost motion connection with the guide pin of the release handle such that rotation of the recliner handle rotates the lock plate to actuate the recliner mechanism without rotating the release handle to unlatch the riser mechanism from the floor.

14. A seat assembly for a motor vehicle comprising:
a seat cushion having a seat cushion frame;
a riser mechanism secured to the seat cushion and operatively coupled to a floor of the vehicle;
a seat back having a seat back frame;
a recliner mechanism coupled between the seat cushion and seat back for pivotally adjusting the seat back relative to the seat cushion, the recliner mechanism including a sector having a rack of teeth extending radially outwardly from the seat back frame and a pawl including a notch, the pawl selectively moveable in and out of locking engagement with the rack of teeth of the sector;
a release handle operatively coupled to the pawl and the riser mechanism for sequentially unlocking the recliner mechanism and the riser mechanism; a lockout mechanism comprising a lock arm having a pawl end and a cam end, the pawl end moveable in and out of the notch for maintaining and releasing the pawl from locking engagement with the rack of teeth of the sector, a cam pivotally coupled to the seat cushion frame for selective movement in and out of engagement with the cam end of the lock arm, and a spring for continuously biasing the cam toward engagement with the cam end of the lock arm; and
a cable extending between the cam and the riser mechanism for moving the cam in and out of engagement with the cam end of the lock arm in response to unlatching and latching of the riser mechanism to the floor of the vehicle.

15. The seat assembly of claim 14 wherein the riser mechanism comprises a latch pivotally supported by the riser mechanism for movement in and out of latching engagement with a striker secured to the floor of the vehicle.

16. The seat assembly of claim 15 wherein the latch includes a lock notch formed therein.

17. The seat assembly of claim 16 including a latch pawl having a lock tab pivotally supported by the riser mechanism.

18. The seat assembly of claim 17 wherein the latch includes a cam surface for engaging the lock tab of the latch pawl.

19. The seat assembly of claim 18 including a biasing member extending between the latch and latch pawl for biasing the latch and latch pawl in opposite directions.

20. The seat assembly of claim 19 including a cable extending between the release handle and latch pawl for rotating the latch pawl.

21. A seat assembly for a motor vehicle comprising:
a seat cushion having a seat cushion frame;
a riser mechanism secured to the seat cushion and operatively coupled to a floor of the vehicle;
a seat back having a seat back frame, the seat back pivotally coupled to the seat cushion for movement between a seating position and a non-seating position;
a recliner mechanism coupled between the seat cushion and seat back for selectively locking the seat back in either of the seating and non-seating positions, the recliner mechanism including a sector having a rack of teeth extending radially outwardly from the seat back frame and a pawl including a notch, the pawl selectively moveable in and out of locking engagement with the rack of teeth of the sector;
a release handle coupled to the pawl and the riser mechanism;
a lockout mechanism comprising a lock arm having a pawl end and a cam end, the pawl end moveable in and out of the notch for maintaining and releasing the pawl from locking engagement with the rack of teeth of the sector for preventing actuation of the recliner mechanism between locked and unlocked states in response to the riser mechanism being unlatched from the floor of the vehicle, a cam pivotally coupled to the seat cushion frame for movement in and out of engagement with the cam end of the lock arm, and a spring for continuously biasing the cam toward engagement with the cam end of the lock arm; and
a cable extending between the cam and the riser mechanism for moving the cam in and out of engagement with the cam end of the lock arm in response to unlatching and latching of the riser mechanism to the floor of the vehicle.

22. The seat assembly of claim 21 wherein the riser mechanism comprises a latch pivotally supported by the riser mechanism for movement in and out of latching engagement with a striker secured to the floor of the vehicle.

23. The seat assembly of claim 22 wherein the latch includes a lock notch formed therein.

24. The seat assembly of claim 23 including a latch pawl having a lock tab pivotally supported by the riser mechanism for movement between latched and unlatched positions.

25. The seat assembly of claim 24 wherein the latch includes a cam surface for engaging the lock tab of the latch pawl.

26. The seat assembly of claim 25 wherein movement of the latch pawl between latched and unlatched positions causes the lock tab to move in and out of engagement with the lock notch.

27. The seat assembly of claim 26 including a biasing member extending between the latch and latch pawl for biasing the latch and latch pawl in opposite directions.

28. The seat assembly of claim 27 including a first cable extending between the release handle and latch pawl for rotating the latch pawl between the latched and unlatched positions in response to movement of a release handle.

29. The seat assembly of claim 28 including a second cable extending between the latch pawl and the cam for moving the cam in and out of engagement with the cam end of the lock arm in response to rotation of the latch pawl between the unlatched and latched positions.

30. A seat assembly for a motor vehicle comprising:
a seat cushion having a seat cushion frame;
a riser mechanism secured to the seat cushion and operatively coupled to a floor of the vehicle;
a seat back having a seat back frame;
a recliner mechanism coupled between the seat cushion and seat back, the recliner mechanism comprising a first pawl moveable in and out of locking engagement with a slot formed in the seat back frame, whereby the seat back is in an upright seating position when the first pawl engages the slot and is moveable to a forwardly folded position when the first pawl is disengaged from the slot; and
a lockout mechanism comprising a second pawl pivotally coupled to the seat cushion frame for movement in and out of engagement with a stop surface formed in the seat back frame, whereby the second pawl engages the stop surface to maintain the seat back in the forwardly folded position, and a cam pivotally coupled to the seat cushion frame and operatively coupled to the riser mechanism for movement in and out of engagement with the second pawl in response to unlatching and latching of the riser mechanism to the floor, whereby the cam engages the second pawl and the second pawl engages the stop surface to maintain the seat back in the forwardly folded position when the riser mechanism is unlocked from the floor.

* * * * *